United States Patent Office 3,350,915
Patented Nov. 7, 1967

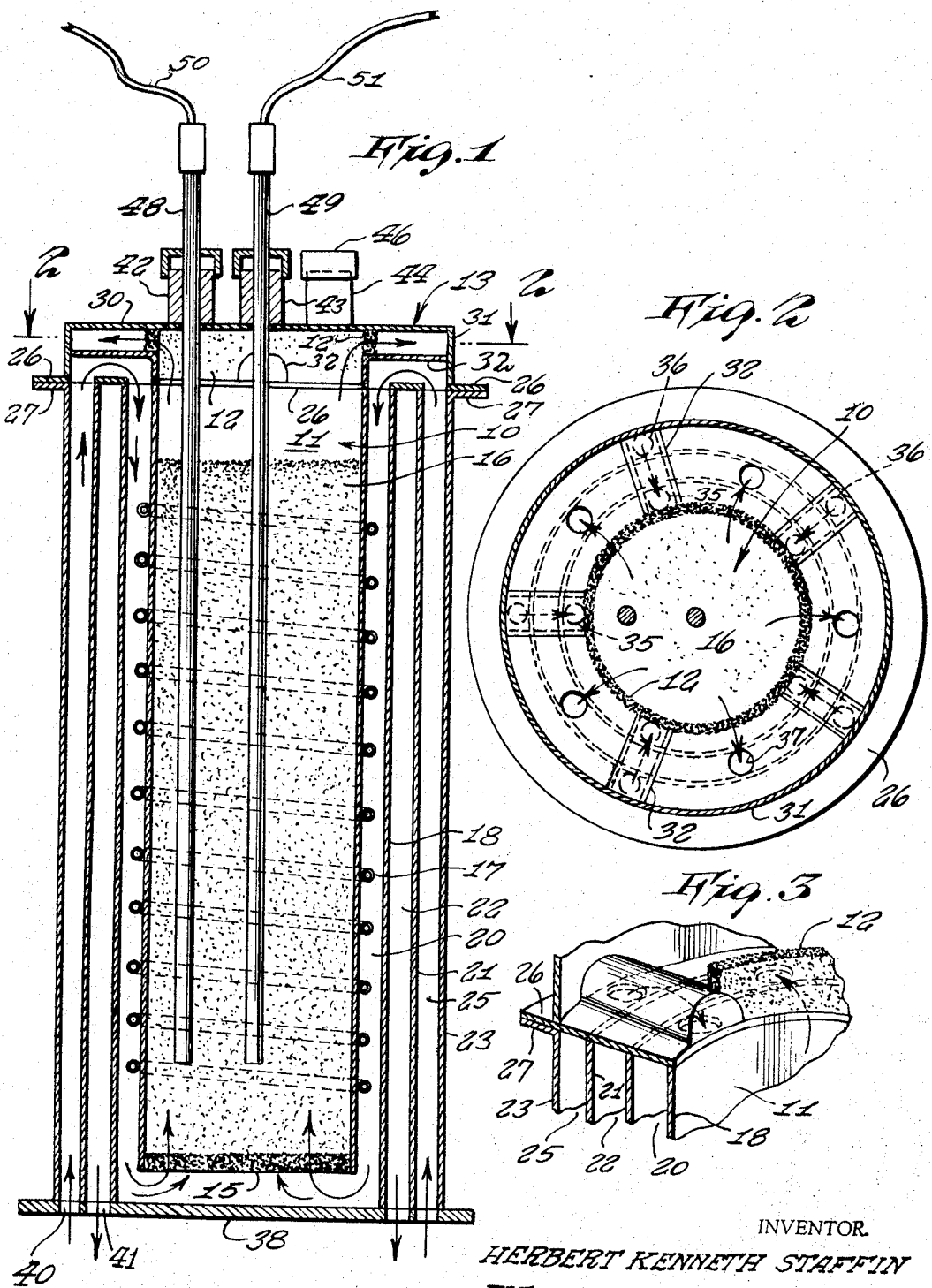

3,350,915
THERMOMETRIC CALIBRATION APPARATUS UTILIZING A FLUIDIZED BED OF SOLID PARTICLES
Herbert Kenneth Staffin, New Brunswick, N.J., assignor to Procedyne Corp., New Brunswick, N.J., a corporation of New York
Filed May 27, 1965, Ser. No. 459,313
14 Claims. (Cl. 73—1)

The present invention relates to temperature calibration apparatus and more particularly to apparatus of this character employing a fluidized bed of inert solid particles to bring the standard instrument and the instrument being calibrated simultaneously to precisely the same temperature.

The use of fluidized inert solid particles permits operation at extremely high and extremely low temperatures. At such extreme temperatures, liquids which are otherwise suitable would either boil away or become frozen.

The device comprises a test chamber. A mass of small solid particles is confined within the test chamber. An inert gas, or mixture of gasses such as air, flow upwardly through the test chamber. The upward gas flow forms a gas-particle mixture which is in a continuous state of agitation such that it behaves in the manner of a quasi-liquid fluid. This condition of the particles is aptly described by the expression "fluidized."

The temperature sensitive portions of the standard instrument and the instrument under calibration are inserted into the test chamber with the temperature sensitive portions of both instruments immersed in the fluidized particles. The term "instrument," as used herein, includes thermometers, thermocouples, thermostats, and, in general, any and all temperature sensitive apparatus of the type which requires calibration against a standard instrument prior to use.

The lateral walls of the chamber are heated or cooled, as required, to obtain the desired calibration temperature. Air or other gas enters the bottom of the chamber through a gas-permeable particle retaining bottom closure. At the top of the test chamber, the air or other gas leaves through a gas-permeable particle retaining closure such that the particles are confined within the test chamber and continuously subjected to the fluidizing action of the upward gas flow. The gas-particle mixture or fluidized bed of particles is continuously and simultaneously brought into heat exchanging contact with the temperature sensitive portions of the standard instrument and the instrument being calibrated so that both instruments quickly attain a stable common temperature which is the same for both instruments within a high degree of precision.

The test chamber is surrounded by heat transfer walls defining jackets through which the incoming and outgoing gas flows. The heat exchange jackets provide a preliminary decrease in the temperature difference between the gas entering the bottom of the test chamber and the spent gas leaving the top of the chamber. If desirable, the temperature of the incoming gas may be pre-adjusted by a separate heating or cooling operation in order further to reduce the amount of temperature change which is required to take place in the heat exchange jackets and in the test chamber.

The invention is described in greater detail in the following specification with reference to the accompanying drawing forming a part hereof.

In the drawing:
FIGURE 1 is a sectional view in elevation of a temperature calibration device embodying the invention.
FIGURE 2 is a plan sectional view taken along the line 2—2 in FIG. 1.
FIGURE 3 is an enlarged fragmentary view, partly broken away and shown in section, illustrating a crossover duct which interconnects the tops of the inner and outer heat exchange jackets.

A calibration chamber 10 is laterally defined by a first cylindrical wall member 11 and a porous ring member 12. The ring member 12 is internally in alignment with the first wall member 11 and forms a part of a cover unit designated generally as 13. The material of which the wall member 11 is formed will be determined by the operating temperature. Generally, stainless steel will be suitable. For high calibration temperatures, however, a ceramic material may be required for the wall member 11.

The bottom of chamber 10 is closed by a gas-permeable separator disc 15 which may be formed of high porosity ceramic material or by one or more layers of fine mesh stainless steel screen material.

A quantity of solid particles 16 is confined within the calibration chamber 10. The particles 16 are formed of inert material such as sand (silica), metal, or glass. Small glass spheres, aluminum oxide powder and sand have proven to be satisfactory in operation. Particles with irregular surfaces, because of better frictional contact with the upwardly moving gas, fluidize more uniformly than smooth spherical particles. The particular material selected for the particles 16 will, of course, be controlled by the operating temperature.

In general, an average particle size of 100 microns is desirable. The preferred distribution is as follows:

| Average | | Percent Retained on U.S. Sieves | | | | |
|---|---|---|---|---|---|---|
| Particle, Microns | Diameter, Inches | Sieve Number | | | | |
| | | 120 | 140 | 170 | 200 | 230 |
| 100 | .0039 | 0% | 40% | 40% | 10% | 10% |

In practice, particles as large as 400 microns in diameter have been fluidized. There is no theoretical minimum diameter for the particle size. However, the particles must be large enough so that they remain confined within the calibration chamber 10 by gas-permeable separating means such as the fine mesh screen or the porous ceramic material used for the porous ring member 12 and bottom closure disc 13. In practice, particles as small as 25 or 50 microns are of little interest.

The cylindrical wall member 11 is surrounded by a helical heat transfer element 17 which maintains the chamber 10 at the desired calibration temperature. For high temperature operation, the element 17 is an electrical resistance heater. For temperatures in the intermediate range, the element 17 is a tube through which a heated liquid is circulated. For temperatures in the low range, the element 17 is a tube through which a refrigerant is caused to flow.

The heat transfer element 17 is laterally surrounded by a second cylindrical wall member 18 coaxial with the first wall member 11. The first and second wall members 11 and 18 form the walls of an inner heat exchange jacket 20. The second wall member 18 is laterally surrounded by a third cylindrical wall member 21 coaxial with the first and second wall members 11 and 18. The second and third wall members 18 and 21 form the walls of an intermediate heat exchange jacket 22. The third wall member 21 is, in turn, laterally surrounded by a fourth cylindrical wall member 23 coaxial with the other wall members. The third and fourth wall members 21 and 23 form the walls of an outer heat exchange jacket 25.

The cover unit 13 comprises a flat annular plate 26 which extends over the tops of the three heat exchange jackets 20, 22 and 25. The annular plate 26 engages an outwardly extending flange 27 formed at the top of the fourth wall member 23. The cover unit 13 also includes a flat circular top closure disc 30 integrally formed with a vertically extending cylindrical side wall 31. The bottom of the side wall 31 is connected to the upper surface of the annular plate 26, the side wall 31 being in alignment with the fourth wall member 22.

The porous ring member 12 extends between the top closure disc 30 and the inner edge of the annular plate 26. The ring member 12 is cut away to receive the inner ends of a series of radially extending semi-cylindrical cross-over ducts 32 the lower edges of which are connected to the upper surface of the annular plate 26. The outer ends of the ducts 32 are connected to the inner surface of the side wall 31.

The annular plate 26 has a regularly circularly arranged series of apertures 35 formed therein and a further series of apertures 36, each located radially outwardly of one of the apertures 35. Each of the apertures 35 is located under one of the cross-over ducts 32 together with one of the apertures 36. A third series of apertures 37 is also formed in the annular plate 26 intermediate the series of apertures 35 and 36, each of the apertures 37 being located directly above the top of the intermediate heat exchange jacket 22.

The second, third and fourth cylindrical wall members 18, 21 and 23, respectively, are supported by a bottom plate 38. The first wall member 11 is suspended from the annular plate 26. Gas inlet apertures 40 are formed in the bottom plate 38 and communicate with the outer heat exchange jacket 25. Gas outlet apertures 41 formed in the bottom plate 38 communicate with the intermediate heat exchange jacket 22.

The top closure disc 30 is shown provided with three gas-tight instrument holders 42, 43 and 44. The holder 44, which is not in use, is closed by a removable cap 46. The instruments are exemplified by a standard thermocouple 48 which is shown positioned in the holder 42 and a test thermocouple 49 which is to be calibrated and which is positioned in the holder 43. The temperature sensitive portions of the thermocouples 48 and 49 are immersed in the fluidized particles 16. The thermocouples 48 and 49 are provided with lead wires enclosed in flexible sheaths 50 and 51, respectively, which extend to suitable electrical measuring apparatus (not shown).

In operation, air or other gas enters the outer heat exchange jacket 25 and rises through the gas inlet apertures 40, crosses over the upper surface of the annular plate 26 through the cross-over ducts 32, descends through the inner heat exchange jacket 20, is subjected to the temperature adjusting action of the heat transfer element 17, and enters the calibration chamber 10 through the gas-permeable bottom closure disc 15. The resistance of the disc 15 to gas flow is effectively uniform across the bottom of the chamber 10 so that the upward flow velocity of the gas is substantially uniform throughout the entire cross-sectional area of the chamber 10. All of the particles 16 are thus fluidized and continuously mixed by inherent turbulence of the upwardly moving gas. The gas, in rising through the calibration chamber 10, causes the particles 16 to be maintained in a "fluidized" state so that the effective heat transfer to the thermocouples 48 and 49 is greatly enhanced with respect to the heat transfer rate which would be obtained using the gas alone without the particles 16. The small particles, each of which has a high specific heat as compared with the gas, are continuously brought into intimate transitory contact with both thermocouples. The temperature of the fluidized particles becomes stabilized for a particular constant temperature of the theat transfer element 17 and a particular steady constant upward flow rate of the gas through the calibration chamber 10. The two thermocouples simultaneously attain stable temperatures which are equal with in a high degree of precision.

The spent gas passes outwardly through the porous ring member 12 at the top of the calibration chamber 10 and then downwardly through the apertures 37 in annular plate 26. The spent gas then passes downwardly through the intermediate heat exchange jacket 22 being exhausted through the outlet apertures 41 in the bottom plate 38. In passing through the jacket 22, the spent gas exchanges heat with the second and third wall members 18 and 21, respectively, heating or cooling them depending upon the operating temperatures of the transfer element 17. In passing consecutively through the inner and outer heat exchange jackets 20 and 25, the incoming gas is pre-heated or pre-cooled, as the case may be, so that its temperature as it enters the bottom of the calibration chamber 10 is adjusted toward equality with its temperature as it leaves the top of the chamber 10. This equalization effect reduces the time required for stabilization at a particular calibration temperature.

While I have shown and described what I believe to be the best embodiments of my invention, it will be apparent to those skilled in the art that various changes and modifications may be made therein without departing from the spirit and scope of the invention as defined in the appended claims.

What is claimed is:

1. Temperature calibration apparatus comprising: means defining a calibration chamber, said defining means comprising first gas-permeable separator means positioned for introducing a gas into said chamber at the bottom portion thereof and second gas-permeable separator means positioned for permitting said gas to leave said chamber at the top portion thereof; a quantity of inert particles in said chamber, said particles being too large to pass through either of said separator means and sufficiently small to become fluidized by the upward flow of said gas through said chamber; temperature adjusting means for adjusting the temperature of said fluidized particles; and means for introducing at least one temperature sensitive instrument into said chamber for contact with said fluidized particles.

2. Apparatus according to claim 1, further comprising heat exchange means for pre-adjusting the temperature of said gas introduced into said chamber by heat exchange with gas leaving said chamber.

3. Apparatus according to claim 2, wherein said temperature adjusting means is located out of contact with said fluidized particles, and in which said heat transfer means further comprises means for bringing said gas introduced into said chamber into heat exchange relationship with said temperature adjusting means.

4. Temperature calibration apparatus comprising wall means laterally defining a vertically elongated calibration chamber; first closure means at the top of said wall means, said first closure means including first gas-permeable separator means; second closure means at the bottom of said wall means, said second closure means including second gas-permeable separator means; a quantity of inert particles confined within said wall means by said closure means, said particles being sufficiently small to become fluidized by the upward flow of gas through said chamber; heat transfer means connected to adjust the temperature of said fluidized particles; and means for introducing at least one temperature sensitive instrument into said chamber.

5. Apparatus according to claim 4, wherein at least one of said separator means is formed of porous ceramic material.

6. Apparatus according to claim 4, wherein at least one of said separator means is formed of screen material.

7. Apparatus according to claim 4, further comprising: outlet means communicating with said chamber through said first separator means; inlet means communicating with said chamber through said second separator means; and heat exchange means for exchanging heat between said inlet and outlet means.

8. Apparatus according to claim 7, wherein said means for heat exchange further comprises means for heat exchange between said inlet means and said heat transfer means, said heat transfer means being located exteriorly of said chamber.

9. Temperature calibration apparatus comprising vertically elongated wall means laterally defining a calibration chamber; first gas-permeable separator means closing the bottom of said chamber; second gas-permeable separator means at the top of said wall means; top closure means extending over the top of said chamber above said second separator means; inlet means for introducing a gas into said chamber through said first separator means, said gas flowing upwardly with substantially uniform velocity throughout the entire cross-sectional area of said chamber; outlet means communicating with said chamber through said second separator means; a quantity of inert particles confined within said chamber, said particles being too large to pass through said separator means and sufficiently small to become fluidized by said upward flow of gas; heat transfer means for adjusting the temperature of said fluidized particles; and instrument supporting means carried by said top closure means for introducing at least one temperature sensitive instrument into said chamber for immersion in said fluidized particles.

10. Apparatus according to claim 5, wherein said heat transfer means extends around said wall means exteriorly thereof and in contact therewith.

11. Apparatus according to claim 10, further comprising: heat exchange means for transferring heat between said inlet and outlet means and between said inlet means and said heat transfer means for preadjusting the temperature of said gas prior to passage thereof through said first separator means.

12. Apparatus according to claim 3, further comprising: heat exchange means for transferring heat between said inlet and outlet means.

13. A method for bringing two temperature sensitive instruments to a common temperature which comprises the steps of: fluidizing a quantity of solid particles by passing a gas upwardly therethrough; confining said fluidized particles within a predetermined space; introducing the temperature sensitive portions of said instruments into said space; maintaining said portions simultaneously immersed in said fluidized particles; adjusting the temperature of said fluidized particles to obtain a desired value for said common temperature and pre-adjusting the temperature of said gas by exchanging heat between portions of said gas prior to and after said fluidizing step.

14. Temperature calibration apparatus comprising: vertically elongated wall means laterally defining a calibration chamber; first gas-permeable separator means closing the bottom of said chamber; second gas-permeable separator means at the top of said wall means and internally in alignment therewith; top closure means extending over the top of said chamber above said second separator means; means for introducing a gas into said chamber through said first separator means, said gas flowing upwardly with substantially uniform velocity throughout the entire cross-sectional area of said chamber; a quantity of inert particles confined within said chamber, said particles being too large to pass through said separator means and sufficiently small to become fluidized by said upward flow of gas; heat transfer means extending around said wall means exteriorly thereof and in contact therewith for adjusting the temperature of said gas; instrument supporting means carried by said top closure means for introducing at least one temperature sensitive instrument into said chamber for immersion in said fluidized particles; and a plurality of horizontally spaced wall means laterally surrounding said chamber and defining a series of heat exchange jackets, therebetween, said heat transfer means being located in the innermost of said jackets; means interconnecting said spaced wall means and defining a plurality of gas flow passages through said jackets, gas entering said chamber flowing downwardly through said innermost jacket immediately prior to passage through said first separator means and gas leaving said chamber through said second separator means flowing through the jacket adjacent to said innermost jacket.

References Cited

UNITED STATES PATENTS

| | | | |
|---|---|---|---|
| 2,299,867 | 10/1942 | Wolfson | 73—1 |
| 3,196,251 | 7/1965 | De Bruyne | 165—104 X |
| 3,213,933 | 10/1965 | Kasparian | 165—104 |

LOUIS R. PRINCE, *Primary Examiner.*

S. C. SWISHER, *Assistant Examiner.*